(12) United States Patent
Kush et al.

(10) Patent No.: US 11,604,924 B2
(45) Date of Patent: Mar. 14, 2023

(54) GENERATING TIME-BASED RECAPS OF DOCUMENTS USING A DEEP LEARNING SEQUENCE TO SEQUENCE MODEL

(71) Applicant: Adobe, Inc., San Jose, CA (US)

(72) Inventors: Shagun Kush, Karnal (IN); Sachin Soni, New Delhi (IN); Nikita Kapoor, Singrauli Madhya Pradesh (IN); Carl Iwan Dockhorn, San Jose, CA (US); Ashish Rawat, Uttarakhand (IN); Ajay Jain, Upper Pradesh (IN); Abhishek Jain, Delhi (IN)

(73) Assignee: Adobe, Inc., San Jose, CA (US)

( * ) Notice: Subject to any disclaimer, the term of this patent is extended or adjusted under 35 U.S.C. 154(b) by 103 days.

(21) Appl. No.: 17/148,125

(22) Filed: Jan. 13, 2021

(65) Prior Publication Data

US 2022/0222439 A1 Jul. 14, 2022

(51) Int. Cl.
*G06F 40/106* (2020.01)
*G06F 40/289* (2020.01)
*G06F 40/30* (2020.01)

(52) U.S. Cl.
CPC ............ *G06F 40/289* (2020.01); *G06F 40/30* (2020.01)

(58) Field of Classification Search
CPC .... G06F 16/345; G06F 15/0291; G06F 40/10; G06F 40/289; G06F 40/30; G06F 40/106
See application file for complete search history.

(56) References Cited

U.S. PATENT DOCUMENTS

| | | | |
|---|---|---|---|
| 2008/0133488 A1* | 6/2008 | Bandaru | G06F 40/30 715/810 |
| 2012/0056901 A1* | 3/2012 | Sankarasubramaniam | G06F 3/017 345/660 |
| 2012/0210203 A1* | 8/2012 | Kandekar | G06F 40/169 715/230 |
| 2013/0151954 A1* | 6/2013 | Ierullo | G06F 3/04842 715/254 |
| 2014/0324883 A1* | 10/2014 | Deolalikar | G06F 16/345 707/748 |

OTHER PUBLICATIONS

See, et al., "Get To The Point: Summarization with Pointer-Generator Networks," arXiv: 1704.04368v2, [cs.CL], Apr. 2017. 20 pages.

\* cited by examiner

*Primary Examiner* — Wilson W Tsui
(74) *Attorney, Agent, or Firm* — Finch & Maloney PLLC

(57) ABSTRACT

Techniques are provided herein for generating improved document summaries that consider the amount of time that has passed since the user last accessed the document. The length of time that has passed since the user has accessed each previous portion of the document is used as a variable to determine how much the summary should focus on each of the previously read sections of the document. When a document is accessed by a user, a relevance score is assigned to content from previously accessed sections of that document, where the relevance score is weighted based on how long ago each of the sections was accessed by the user. Once the various content items of previous sections have been provided relevance scores, selected sentences with the highest relevance scores are fed to a deep learning sequence-to-sequence model is used to build the document summary.

20 Claims, 9 Drawing Sheets

302

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over 304-1

Here's Your Personalized Recap:

The quick brown fox jumps over the lazy dog. The quick brown fox jumps over the lazy dog. The quick brown fox jumps over the lazy dog. The quick brown fox jumps over the lazy dog.

The quick brown fox jumps over the lazy dog. The quick brown fox jumps over the lazy dog.

The quick brown fox jumps over the lazy dog. The quick brown fox jumps over the lazy dog.

MORE the lazy dog.

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over 304-2

Here's Your Personalized Recap:

After jumping over the lazy dog four times, the quick brown fox took a long nap.

When he awoke, the fox ate some food with his friend the monkey.

Food

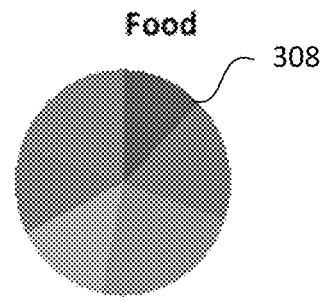

308

MORE the lazy dog.

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over 304-3

Here's Your Personalized Recap:

The quick brown fox jumps over the lazy dog. The quick brown fox jumps over the lazy dog. The quick brown fox jumps over the lazy dog. The quick brown fox jumps over the lazy dog.

The quick brown fox jumps over the lazy dog. The quick brown fox jumps over the lazy dog.

The quick brown fox jumps over the lazy dog. The quick brown fox jumps over the lazy dog.

Reviewer 1: We should focus more on this aspect.

Reviewer 2: Let's remove this part and place it closer to the end of Section 4.

MORE

306 the lazy dog.

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

GENERATING TIME-BASED RECAPS OF DOCUMENTS USING A DEEP LEARNING SEQUENCE TO SEQUENCE MODEL

FIELD OF THE DISCLOSURE

This disclosure relates to techniques for generating document recaps that take into account the passage of time.

BACKGROUND

Electronic documents have increasingly become one of the primary sources of information for many users. Whether the documents are being read for school, work, or leisure, we consume a vast amount of information from reading electronic documents. However, when a document is accessed more than once over a given period of time, it can be difficult to recall what has already been read from the document. Research has shown that an individual forgets on average around 56% of information after 24 hours, around 66% of the information after 48 hours, and around 75% of the information after about 6 days. This can be challenging when accessing a document multiple times as the current information one is taking in often requires knowledge of the information from earlier in the document. While some document recap solutions have been attempted, they fail to provide recaps that specifically address how much of the previous information the user may have forgotten. Therefore, complex and non-trivial issues associated with improving document recaps remain.

SUMMARY

Techniques are provided herein for generating an improved document summary (also referred to herein as a recap) that considers the amount of time that has passed since the user last accessed the document. Furthermore, the techniques described herein track how often a user has accessed the document and which portions of the document were accessed each time. The length of time that has passed since the user has accessed each previous portion of the document is used as a variable to determine how much the recap should focus on each of the previously read sections of the document. For example, if a section of the document was last read by the user before any of the other previously read sections, then more content devoted to that section is present in the generated recap since it is more likely that the user will have forgotten information from that section. The recap can include snippets of text, figures, and/or author comments from a previously read section of the document. The level of detail of the recap can vary and is based on a number of factors. In more detail, when a document is accessed by a user, a relevance score is assigned to content from previously accessed sections of that document. The relevance score is weighted based on how much time has passed since each of the sections was accessed by the user. Once the various content items of previous sections have been provided relevance scores, sentences (or other particular content items) having the highest relevance scores are fed to a deep learning sequence-to-sequence model to build the recap. The process can be iterated until all of the most relevant content has been provided as part of the recap. As noted above, the content items may include sentences, figures, comments, headers, footnotes, or any other aspect of the electronic content. Numerous variations and embodiments of the disclosed techniques will be appreciated in light of this disclosure.

Any number of non-transitory machine-readable mediums (e.g., embedded memory, on-chip memory, read only memory, random access memory, solid state drives, and any other physical storage mediums) can be encoded with instructions that, when executed by one or more processors, cause an embodiment of the techniques provided herein to be carried out, thereby allowing for robust analysis of electronic content that has been consumed over a period of time (user journey data). Likewise, the techniques can be implemented in hardware (e.g., logic circuits such as field programmable gate array, purpose-built semiconductor, microcontroller with a number of input/output ports and embedded routines). Numerous embodiments will be apparent in light of this disclosure.

BRIEF DESCRIPTION OF THE DRAWINGS

FIG. 3A shows an example of a generated document recap that includes only text, in accordance with an embodiment of the present disclosure.

FIG. 3B shows another example of a generated document recap that includes text and figures, in accordance with an embodiment of the present disclosure.

FIG. 3C shows another example of a generated document recap that includes text and comments, in accordance with an embodiment of the present disclosure.

DETAILED DESCRIPTION

Figure 1:
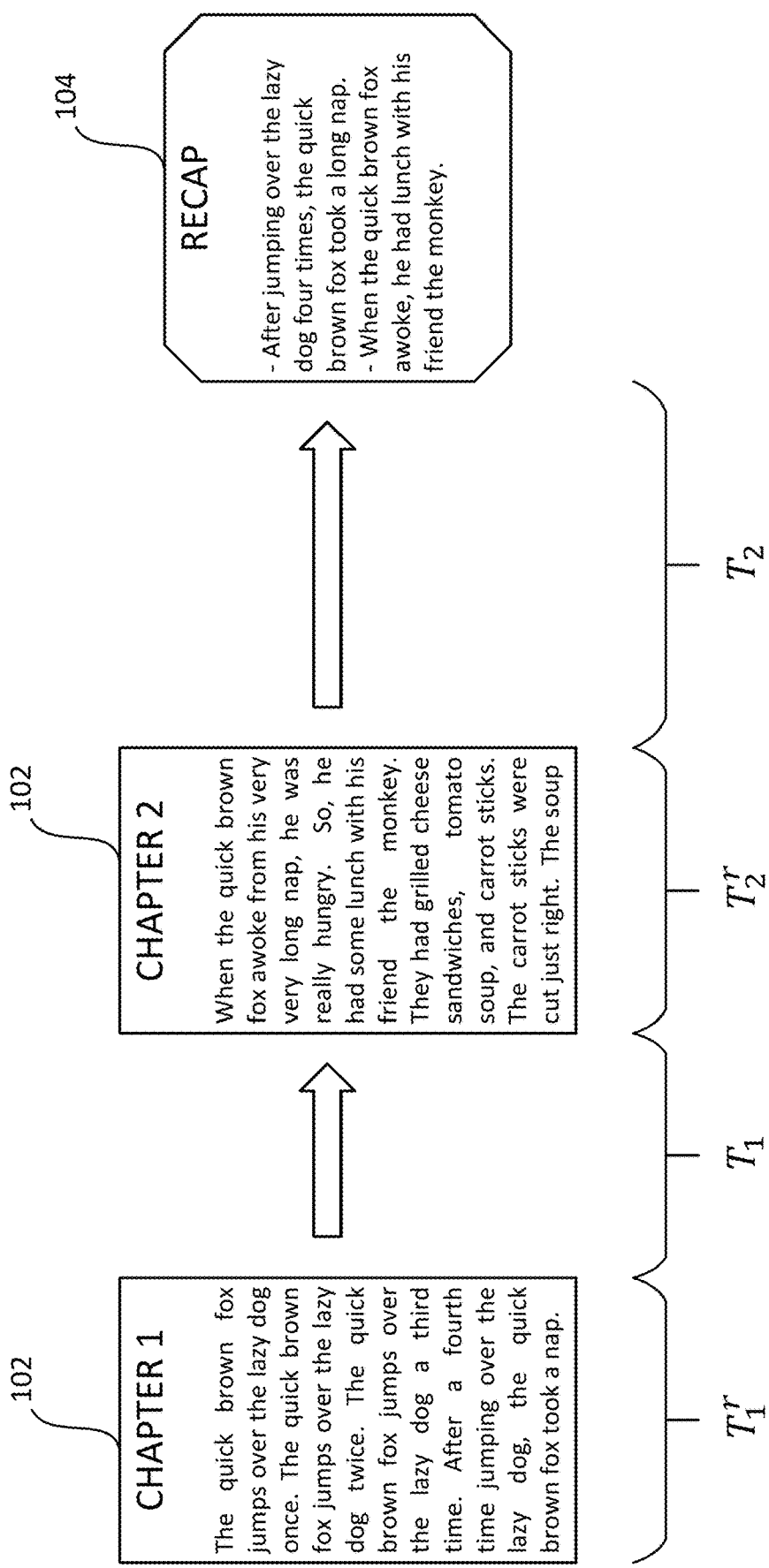
FIG. 1 shows an example use case where a user accesses a document over different periods of time and receives a recap upon accessing the document a third time, according to an embodiment of the present disclosure.

Techniques are provided herein for generating document summaries which take into account the amount of time that passes between various previously read sections of the document. For example, the summary that a user receives upon opening a document again will be different depending on whether the document was last accessed by that user 2 days ago, 5 days ago, or a month ago. According to some such embodiments of the present disclosure, the length and content of the generated summary for a given previously read section of the document changes proportionally to a time gap since the user last read that section. As will be appreciated, the term "time gap" refers to the length of time that has passed between when a user last accessed a given section of the document and when the user accesses the document again and a document recap is being generated. Checkpoints are determined based on when the user has read the document in order to divide the document into different read sections. Each section is attributed a percent weightage in the final summary content. This percent weightage is calculated based on the length of time that has passed since the given section was last read and is fed to an attention input of a deep learning summarization model. The model learns to focus on the relatively high weight sections and uses fewer lines from the low weightage sections.

The summarization techniques described herein work for any paginated electronic document in any format, such as text and rich text documents, pdf documents, or more generally any electronic document that includes consumable textual content (including an image document that includes text detectable by techniques such as optical character recognition). Furthermore, the document recap may include document content beyond just sentences from the document. For example, figures can be included in the document recap as well as tracked or other user-provided comments provided in digital format or in a format convertible to digital format. In some embodiments, figures and/or tracked comments are provided a higher priority for inclusion in the recap compared to body sentences from the various document sections. Recapping the tracked changes can be quite important when dealing with a document that is being reviewed and shared amongst multiple users. Review documents are often completed in iterations and different stages. In such scenarios, a personalized recap based on a particular user's time away from the document becomes highly useful.

General Overview

As noted above, while some document recap solutions have been attempted, they fail to provide recaps that specifically address how much of the previous information the user may have forgotten. Thus, a user gets the same recap, regardless of the time they last accessed the given content. In contrast, techniques provided herein generate document summaries which take into account the amount of time that passes between various previously read sections of the document. The techniques may be embodied in devices, systems, methods, or machine-readable mediums, as will be appreciated. For example, according to a first embodiment of the present disclosure, a system is provided that is configured to generate a summary corresponding to a portion of a document that was previously consumed by a user. The system includes at least one processor and various modules executable by the processor(s) to carry out the summarization process. The modules include a document module, a scoring module, and a summarization module. The document module is programmed or otherwise configured to: determine a first timestamp associated with a first instance of opening the document and a second timestamp associated with an instance of closing the document; determine a section of the document accessed between the first timestamp and the second timestamp; and determine a time gap between the first instance of closing the document and a second instance of opening the document. The scoring module is programmed or otherwise configured to: determine a recap factor based on (1) a difference between the first timestamp and the second timestamp and (2) the time gap; and determine a relevance score for each of a plurality of sentences within the section of the document based at least on the recap factor. The summarization module is programmed or otherwise configured to: select K number of sentences having the highest relevance scores from the section of the document, where the value of K is equal to a number of sentences having relevance scores above a given threshold; generate at least a portion of the document summary using at least the selected K number of sentences;

and cause presentation of at least a portion of the summary. The presentation may be, for instance, a visual presentation via a display or an aural presentation via a speaker or a tactile presentation via a Braille machine.

According to another embodiment of the present disclosure, a method for generating a summary of a document is provided. The method includes: determining a first time associated with a first instance of opening the document and a second time associated with an instance of closing the document; determining a section of the document accessed between the first time and the second time; determining a time difference between the second time and a third time associated with a second instance of opening the document; determining a recap factor based on (1) a time difference between the first time and the second time and (2) the time difference between the second time and a third time; determining a relevance score for each of a plurality of sentences within the section of the document based at least on the recap factor; selecting K number of sentences having the highest relevance scores from the section of the document, wherein the value of K is equal to a number of sentences having relevance scores above a given threshold; generating at least a portion of the summary of the document using at least the selected K number of sentences; and causing presentation of at least a portion of the summary. Again, the presentation can be carried out in a manner to increase accessibility. As will be appreciated, accessibility tools used to present the body of content can be used to present the summary as generated herein, according to some embodiments.

Numerous examples are described herein, and many others will be appreciated in light of this disclosure.

Document Recap Example

FIG. 1 illustrates an example situation where a user accesses a document 102 over different periods of time and receives a recap 104 upon accessing document 102 a third time. Document 102 can represent any type of electronic document format that has some capability of tracking where in the document a user has left off when closing the document. For example, a paginated document may track the page on which a user was last present when the document is closed. There are two different types of time periods that are tracked when a user accesses a document, according to some embodiments. A read time (T') is tracked during each read section of the document, while a gap time (T) is tracked between each read section of the document. The gap time (T) may also be considered as the time difference between a time when the document is closed and a time when the document is subsequently next reopened. Multiple different gap times (T) and read times (T') may be calculated depending on how many times the document is closed and subsequently reopened by a given user.

In the illustrated example of FIG. 1, a user accesses document 102 and reads a first section of document 102 during a first read time $T_1''$. For example, the user may begin at the first page of the document and read a certain number of pages during the first read time $T_1''$ (e.g., chapter 1 in this particular example case). First read time $T_1''$ represents the time between a first instance of opening document 102 and a first instance of closing document 102. After closing document 102, the user is away from the document for a first time gap ($T_1$) before reopening document 102 at a later time. Time gap $T_1$ represents the time difference between the first instance of closing document 102 and a second instance of opening document 102. The user then picks up where he or she left off in document 102 and continues to read further for a second read time $T_2^r$. Second read time $T_2^r$ represents the time between the second instance of opening document 102 and a second instance of closing document 102. Thus, as will be further appreciated, first read time $T_1^r$ represents the time spent reading a first section of the document and second read time $T_2^r$ represents the time spent reading a second section of the document. After again closing document 102 after reading through the second section of document 102, another time gap $T_2$ occurs before the user opens document 102 again at some later time. According to an embodiment, a recap 104 is generated for the user upon opening the document again after time gap $T_2$, to recap content from both the first and second read sections of document 102. It should be noted that a recap may also be provided upon accessing document 102 following the first time gap $T_1$ that summarizes the content from the first reading period only, or any other subsequent reading session where a summary sensitive to the time gap duration between reading sessions would be helpful.

Recap 104 includes more content from earlier read sections of the document as the user is more likely to have forgotten content from these sections, according to some embodiments. A recap factor is calculated for each of the read sections that provides a weighted value to use when determining how much content from each of the read sections should be included in recap 104. In the illustrated example, the first read section (chapter 1) would be provided a higher recap factor than the second read section (chapter 2). The difference between the calculated recap factors depends on the respective read times and time gap after each section. For example, the recap factor for the first read section will be comparatively much higher than the recap factor for the second read section if $T_1$ is much higher than $T_2$. Conversely, if $T_2$ is much higher than $T_1$, then the recap factor for the first read section may only be slightly higher than the recap factor for the second read section. The higher recap factor for the first section provides a higher weighted importance on using content from the first section when generating recap 104. The generation of recap 104 uses a sequence-to-sequence with attention model to select and/or generate the items within recap 104 and is described in more detail herein. Briefly, and according to one example use case, if each of the first and second sections arbitrarily includes ten sentences, the recap may include, for example, content from the third and fourth sentences from the first section, and the second sentence of the second section.

Figure 2:
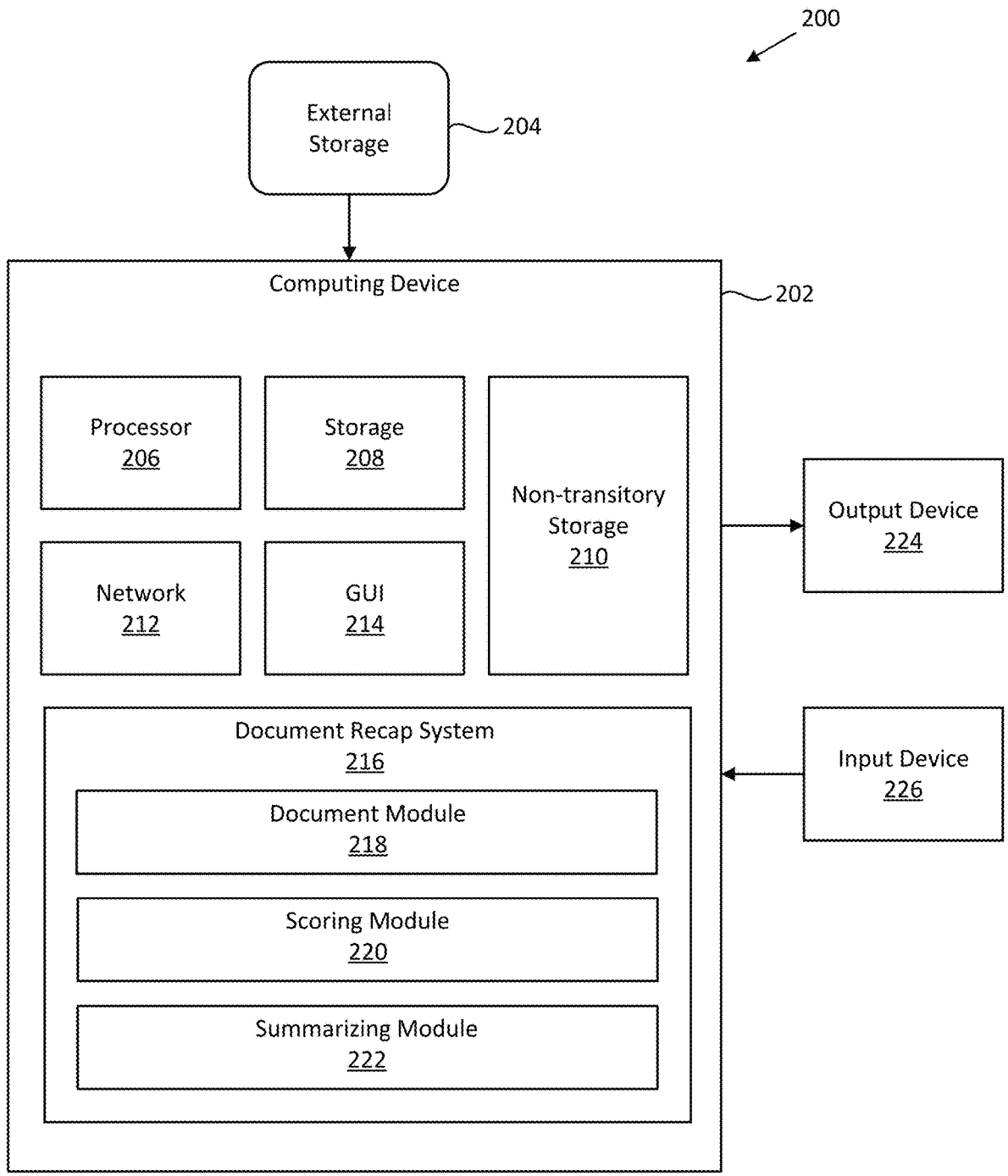
FIG. 2 shows an example system having a document recap system, in accordance with an embodiment of the present disclosure.

FIG. 2 shows an example system 200 that, among other things, implements a document recap system 216 to generate time-based recaps of an electronic document, according to an embodiment. The system 200 includes various hardware components such as a computing device 202 having a processor 206, a storage 208, a non-transitory storage medium 210, a network interface 212, and a graphical user interface (GUI) 214. As will be appreciated, document recap system 216 may be part of a more comprehensive application (such as a word or rich text processing application or an e-Reader application). GUI 214 may include a display and a user input device. In some embodiments, GUI 214 represents a command-line interface. More generally, any number of standard or proprietary user input devices and/or GUIs can be used, as will be appreciated.

According to some embodiments, processor 206 of the computing device 202 is configured to execute the following modules of document recap system 216, each of which is described in further detail below: document module 218, scoring module 220, and summarization module 222. In some embodiments, computing device 202 is configured to receive or retrieve one or more documents that are stored in external storage 204 or storage 208. External storage 204 may be local to device 202 (e.g., plug-and-play hard drive) or remote to device 202 (e.g., cloud-based storage), and may represent, for instance, a stand-alone external hard-drive, external FLASH drive or any other type of FLASH memory, a networked hard-drive, a server, or networked attached storage (NAS), to name a few examples. As will be discussed in more detail herein, each of the modules 218, 220, and 222 are used in conjunction with each other to complete a process for generating document recaps for any documents retrieved from storage 208 or external storage 204. While three distinct modules are shown, other embodiments may include fewer or more modules. To this end, the degree of modularity may vary from one embodiment to the next, but still achieve comparable functionality.

Computing device 202 can be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), virtual reality (VR) device or VR component (e.g., headset, hand glove, camera, treadmill, etc.) or other form of computing or telecommunications device that is capable of communication and that has sufficient processor power and memory capacity to perform the operations described in this disclosure. A distributed computational system can be provided including a plurality of such computing devices. Further note that computing device 202 may be, for example, a client in a client-server arrangement, wherein at least a portion of the document recap system 216 is served or otherwise made accessible to computing device 202 via a network (e.g., the Internet and a local area network that is communicatively coupled to the network interface 212).

Computing device 202 includes one or more storage devices 208 or non-transitory computer-readable mediums 210 having encoded thereon one or more computer-executable instructions or software for implementing techniques as variously described in this disclosure. The storage devices 208 can include a computer system memory or random access memory, such as a durable disk storage (which can include any suitable optical or magnetic durable storage device, e.g., RAM, ROM, Flash, USB drive, or other semiconductor-based storage medium), a hard-drive, CD-ROM, or other computer readable mediums, for storing data and computer-readable instructions or software that implement various embodiments as taught in this disclosure. The storage device 208 can include other types of memory as well, or combinations thereof. The non-transitory computer-readable medium 210 can include, but is not limited to, one or more types of hardware memory, non-transitory tangible media (for example, one or more magnetic storage disks, one or more optical disks, one or more USB flash drives), and the like. The non-transitory computer-readable medium 210 included in the computing device 202 can store computer-readable and computer-executable instructions or software for implementing various embodiments (such as instructions for an operating system as well as application software that includes document recap system 216). The computer-readable medium 210 can be provided on the computing device 202 or provided separately or remotely from the computing device 202.

The computing device 202 also includes at least one processor 206 for executing computer-readable and computer-executable instructions or software stored in the storage device 208 or non-transitory computer-readable medium 210 and other programs for controlling system hardware. Processor 206 may have multiple cores to facilitate parallel processing or may be multiple single core processors. Any number of processor architectures can be used (e.g., central processing unit and co-processor, graphics processor, digital signal processor). Virtualization can be employed in the computing device 202 so that infrastructure and resources in the computing device 202 can be shared dynamically. For example, a virtual machine can be provided to handle a process running on multiple processors so that the process appears to be using only one computing resource rather than multiple computing resources. Multiple virtual machines can also be used with one processor. Network interface 212 can be any appropriate network chip or chipset which allows for wired or wireless connection between the computing device 202 and a communication network (such as local area network) and other computing devices and resources.

A user can interact with the computing device 202 through an output device 224, such as a screen or monitor, which can display one or more user interfaces or images, including text of one or more electronic documents and/or document recaps, as provided in accordance with some embodiments. Computing device 202 can include input or input/output devices 226 for receiving input from a user, for example, a keyboard, a joystick, a game controller, a pointing device (e.g., a mouse, a user's finger interfacing directly with a touch-sensitive display device, etc.), a microphone, a speaker, or any suitable user interface, including an AR headset. The computing device 202 may include any other suitable conventional I/O peripherals, including those that improve accessibility of the device. In some embodiments, computing device 202 includes or is operatively coupled to various suitable devices for performing one or more of the aspects as variously described in this disclosure.

The computing device 202 can run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 202 and performing the operations described in this disclosure. In an embodiment, the operating system can be run on one or more cloud machine instances.

In other embodiments, the functional components/modules can be implemented with hardware, such as gate level logic (e.g., FPGA) or a purpose-built semiconductor (e.g., ASIC). Still other embodiments can be implemented with a microcontroller having several input/output ports for receiving and outputting data, and several embedded routines for carrying out the functionality described in this disclosure. In a more general sense, any suitable combination of hardware, software, and firmware can be used to provide a functional computing device or system, as will be apparent.

As will be appreciated in light of this disclosure, the various modules and components of the system, such as document recap system 216, document module 218, scoring module 220, summarizing module 222, GUI 214, or any combination of these, may be implemented in software, such as a set of instructions (e.g., HTML, XML, C, C++, object-oriented C, JavaScript®, Java®, BASIC, etc.) encoded on any machine-readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions performed by the user computing system, as described in this disclosure, can be performed by one or more suitable processors in any number of configurations and arrangements, and that the depicted embodiments are not intended to be limiting. Various components of this example embodiment, including the computing device 202, can be integrated into, for example, one or more desktop or laptop computers, workstations, tablets, smart phones, game consoles, VR devices, set-top boxes, or other such computing devices. Other componentry and modules typical of a computing system, will be apparent.

According to some embodiments, document module 218 is configured to identify timing aspects with regards to when a user opens and closes a given document and what section(s) of the document was read by the user. In some such embodiments, document module 218 uses a local system clock or a remote clock or any other accessible timing source to track time and determine timestamps corresponding to various document events, such as opening or closing a document. According to some such embodiments, document module 218 can track timing events for any number of documents and for any number of different users (e.g., based on user login credentials and/or profiles). To this end, note that the same document may be accessed by more than one user, and the times associated with opening and closing the document may be tracked separately for each of the users. Similarly, the same user may access multiple documents, and the times associated with opening and closing each of the documents may be tracked separately for each document. Document module 218 also tracks which pages of a document where accessed between the time the document was opened and the time the document was closed by a given user. The accessed pages correspond to a read or otherwise consumed section of the document that is used when generating the document recap when the document is subsequently accessed again by the user.

According to some embodiments, document module 218 also tracks how much time is spent reading each document section (e.g., based on times between page turns, or times between scrolling past page markers) and the time that has passed (time gap) between a time when the document is closed by a user and a time when the document is again opened by the user. As noted above, these time gaps for any given document are tracked separately for different users such that each user can receive their own personal recap for a given document based on how long they have individually been away from the document. The determined time spent on each section and time gap(s) are taken into account when generating the document recap for a particular user. Further details regarding the operations of document module 218 are provided herein with reference to FIG. 5

According to some embodiments, scoring module 220 is configured to determine a recap factor associated with each previously read section of a document when a user re-opens the document. The recap factor may be a value that attributes a certain weight to a given section depending on how much the recap should focus on the section. For example, a section of the document that was read the longest time ago by a given user would be provided a relatively high recap factor compared to another section that was read more recently by the user. These different weights are then used to generate a summary that focuses more attention on the sections having the higher recap factors. In some embodiments, the recap factors are numerical values between 0 and 1.

According to some embodiments, scoring module 220 is further configured to use the recap factor for a given section of the document to determine relevance scores for sentences and/or other document content in the given document section. A higher recap factor yields higher relevance scores for the sentences and/or content. Ultimately, the relevance scores for all of the various sentences and/or other document content across all previously read document sections are used when generating the document recap. Further details regarding the scoring process of document sentences and/or other content based on time and other relevancy factors are provided herein with reference to FIGS. 5 and 6.

According to some embodiments, summarization module 222 is configured to generate a document recap based on the relevance scores of the sentences and/or other document content from any previously read sections of the document. The recap may be generated line by line by selecting a certain number of top-scored sentences and generating a line for the recap based at least on that input. In some embodiments, summarization module 222 uses a sequence-to-sequence with attention model to generate each line of the document recap. The model is capable of either copying a word from the source text to include in the recap or generating a new word from a word repository to include in the recap. The document recap is displayed or otherwise presented to the user upon accessing the document for at least a second time, according to some embodiments. Further details regarding the generation of the document recap are provided herein with reference to FIG. 7.

FIG. 3A illustrates an example presentation of a document 302 to a user upon opening the document for at least a second time. Once the user accesses the document after being away from it for some period of time, a document recap 304-1 may be presented as an overlay or a pop-up screen in front of the opened document 302. As is discussed in more detail herein, document recap 304-1 includes a personalized recap for the user based on what sections of the document he or she has previously read, how long it has been since each of the previous sections has been accessed, and how much time was spent reading each of the sections. As previously indicated, the recap 304-1 includes select salient sentences (or content generated from select salient sentences) from the overall sections previously consumed. So, for instance, a recap 304-1 of a five page chapter may include non-contiguous sentences from the third, fourth and fifth pages of that chapter. Further note the sentences included in the summary may include paraphrasing or otherwise capture the semantic meaning of the consumed content and are not necessarily exact copies of sentences from the content being summarized, as will be further appreciated.

According to some embodiments, document recap 304-1 includes a more button 306 that can be clicked by the user to expand document recap 304-1 and show more content from previously read document sections. In some examples, clicking on more button 306 causes summarization module 222 to generate more sentences and/or other document content for document recap 304-1 based on whichever additional sentences are determined to be the most relevant. In other examples, summarization module 222 determines a full document recap based on highly relevant sentences and/or or other document content and only illustrates a portion of the recap as the initial document recap 304-1. In some such examples, clicking on more button 306 provides the additional recap sentences and/or other document content that have already been generated by summarization module 222.

FIG. 3B illustrates another example presentation of document 302 to a user upon opening the document for at least a second time. Once the user accesses the document after being away from it for some period of time, a document recap 304-2 may be presented as an overlay or a pop-up screen in front of the opened document 302. Document recap 304-2 includes one or more FIGS. 308 as part of the recap. According to some embodiments, any figures from previously read sections are accorded a high relevancy score and are thus very likely to be included in the recap when it is being generated. In some embodiments, any figures from previous sections are always included in the recap.

FIG. 3C illustrates another example presentation of document 302 to a user upon opening the document for at least a second time. Once the user accesses the document after being away from it for some period of time, a document recap 304-3 may be presented as an overlay or a pop-up screen in front of the opened document 302. Document recap 304-3 includes review comments provided in the document by one or more different users. Accordingly, document 302 may be a shared document that is accessed and reviewed by more than one user. In a more general sense, document 302 may include a main or primary portion and a commentary or secondary portion, where the commentary or secondary portion is user-provided, for instance, after that user has consumed the main or primary portion. The commentary or secondary portion could include, for example, user notes or annotations, feedback to an author, editorial notations/comments, or other user-generated content.

Providing user comments as a part of document recap 304-3 can be very important as document reviews are commonly performed in iterations and different stages. Accordingly, review comments may be populated in a document between the time when a user last accessed the document, and are thus important to bring to the user's attention along with other relevant content from previously accessed document sections. According to some embodiments, any comments from previously read sections are accorded a high relevancy score and are thus very likely to be included in the recap when it is being generated. In some embodiments, any comments from previous sections are always included in the recap. Some very long comments may be shortened when presented as part of document recap 304-3.

Figure 4:
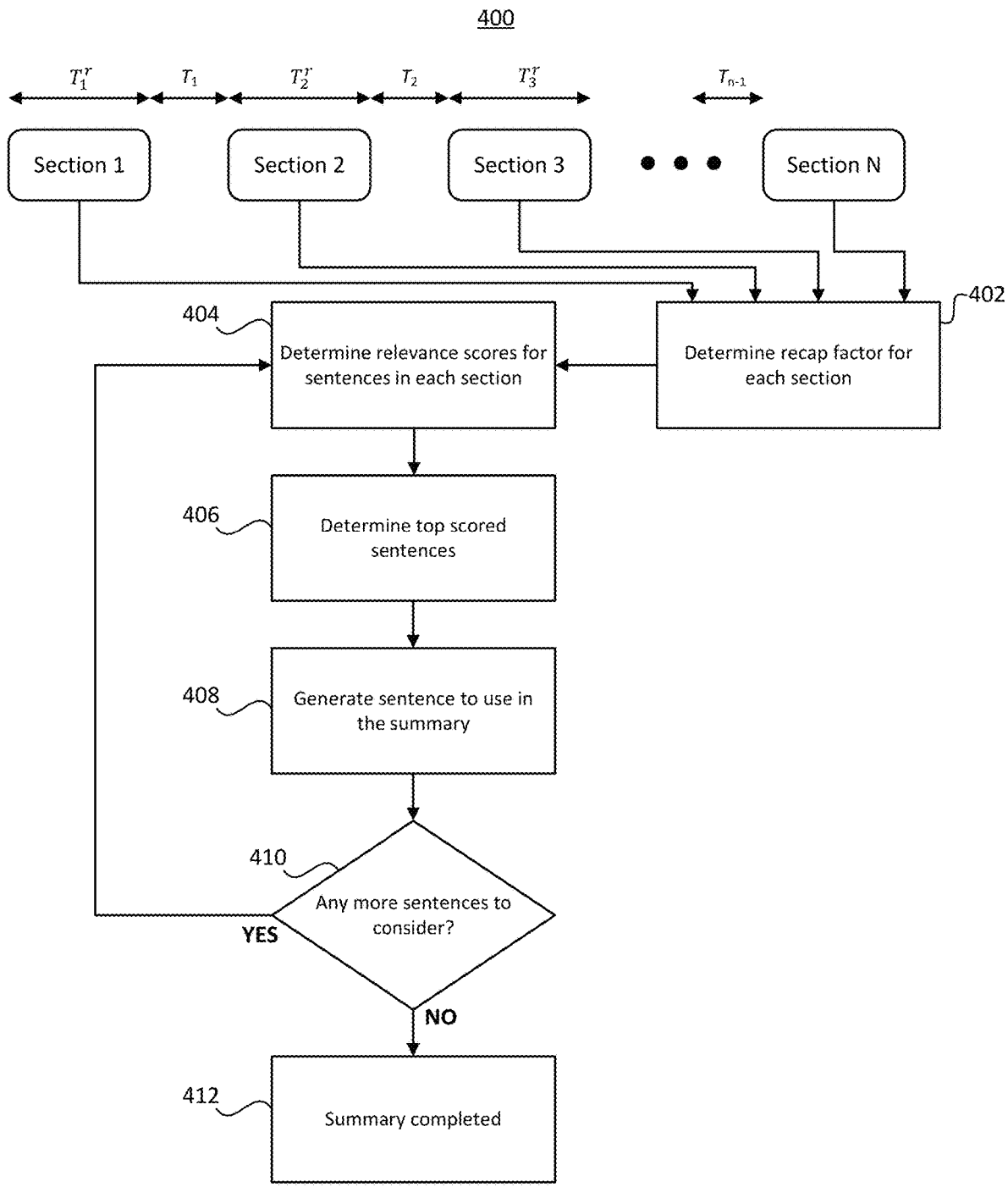
FIG. 4 is a flow diagram of a process for generating a document recap that considers the passage of time between reading sections of the document, in accordance with some embodiments of the present disclosure.

FIG. 4 illustrates an example method 400 of generating a document recap based at least on time away from the document, according to an embodiment. The operations, functions, or actions described in the respective blocks of example method 400 may be stored as computer-executable instructions in a non-transitory computer-readable medium, such as a memory and/or a data storage of a computing system. As will be further appreciated in light of this disclosure, for this and other processes and methods disclosed herein, the functions performed in method 400 may be implemented in a differing order. Additionally, or alternatively, two or more operations may be performed at the same time or otherwise in an overlapping contemporaneous fashion.

Various sections of a document may be read by a user as identified at the top of method 400. For example, a user may read a first section of a document (Section 1) over a first read period ($T_1^r$), then following a first time gap ($T_1$) read a second section of the document (Section 2) over a second reading period ($T_2^r$), then following a second time gap ($T_2$) read a third section of the document (Section 3) over a third reading period ($T_3''$). This process may repeat for any number of additional accessed sections of the document over any period of time.

At block 402, a recap factor is determined for each and every previously read section of the document, according to an embodiment. The recap factor provides a time-based relevancy weight to each section depending on how long in the past the section was read by the user. Accordingly, in an example where three different sections of the document have been previously read, the recap factor for the first section is relatively high due to the sum of all time gaps and section read times of all the proceeding sections, while the recap factor for the most recently read section is relatively lower due to there being only a single time gap proceeding that section when the user accesses the document again and receives the document recap.

The recap factor for a given section $t(S_x)$ is provided by the following:

$$t(S_x) = \frac{\sum_{i=x+1}^{n} T_i}{\sum_{i=1}^{n} T_i + \sum_{j=1}^{n} T_j^r} \quad (1)$$

Where $T_i$ represents the time gap after the $i^{th}$ section and $T_j^r$ represents the time spent reading the $j^{th}$ section, with n being the total number of previous read sections. In general terms, the recap factor for a given section x is determined based on the total time gaps that exist after section x divided by the sum of each of the time gaps and the total time spent reading each of the document sections. According to an embodiment, the recap factor is a number between 0 and 1. Further details of the operations performed in block 402 according to an embodiment are provided with reference to FIG. 5.

At block 404, the determined recap factors are used to determine relevance scores for each of the sentences in each previously read section of the document, according to an embodiment. Relevance scores may also be determined for other document content like figures, review comments, headings, etc., or these other document content items may be assigned fixed relevance scores. According to some embodiments, the relevance scores are determined using a modified Maximal marginal relevance (MMR) scoring technique that factors in the importance of the content, the redundancy of the content, and the recap factor associated with the content.

The relevance score for a given sentence $s_i$ may be determined using the following expression:

$$\operatorname{argmax}[\lambda_1 Sim_1(s_i,D)-(1-\lambda_1)\max Sim_2(s_i,s_j)+\lambda_2 t(s_i)] \quad (2)$$

Where $\lambda_1 Sim_1(s_i,D)$ represents an importance factor, $(1-\lambda_1)\max Sim_2(s_i, s_j)$ represents a redundancy factor and $t(s_i)$ is the recap factor. The importance factor measures how similar a given sentence $s_i$ is to the rest of the document D. Important sentences usually show similarity to the centroid of the different document sections. A sentence that is found to have high similarity to other portions of the document is determined to be important and is thus determined to have a higher importance factor. $Sim_1$ is a function that determines cosine similarity between two sentences and can be found as the dot product of the vector representation of the two sentences, according to some embodiments. The redundancy factor measures the maximum similarity between a given sentence $s_i$ from the document to each sentence $s_j$ that is already part of the generated recap and acts as a proxy of redundancy. A sentence that is found to be redundant (e.g., the sentence already exists in the recap or there are one or more similar sentences already in the recap) will have a higher redundancy score, thus lowering the overall relevance score. Since the recap factor $t(s_i)$ is determined for an entire document section, each of the sentences within the same document section are assigned the same recap factor. Balancing factors $\lambda_1$ and $\lambda_2$ may be provided to balance the overall equation and ensure that each of the three relevance factors (importance, redundancy, and recap factor) are given their proper weight in determining the final relevance score. According to some embodiments, a unique relevance score is provided to each sentence and/or other document content found in each previously read section of the document. Further details of the operations performed in block 404 are provided with reference to FIG. 6.

At block 406, a given number of top-scored sentences are selected to be used by summarization module 222 to generate a line of the document recap, according to an embodiment. The top scored sentences may be selected from across any of the previously accessed document sections. In some examples, K top scored sentences are selected where K represents a number of sentences that have a relevance score above a given threshold. In some other examples, K top scored sentences are selected where K represents a predetermined number of sentences or a number of sentences that is based on the recap factors.

At block 408, a sentence is generated for use in the document recap based on the K top-scored sentences selected in block 406, according to an embodiment. A sequence-to-sequence with attention model receives the K sentences as an input to a single layer bi-directional LSTM network encoder and outputs a line for the summary, according to some embodiments. Further details of the document recap generation process are provided with reference to FIG. 7.

At block 410, after a line of the recap has been generated in block 408, a determination is made whether there are more sentences in the document to consider for the recap, according to an embodiment. The determination may be based on any number of factors. For example, if there are any remaining sentences that have a relevance score above a certain threshold, then block 410 determines that there are more sentences to consider. In another example, if all sentences have been used as input at one time or another into the model for generating the recap at block 408, then block 410 determines that there are no more sentences to consider. In yet another example, when the recap includes K sentences, it is considered to be complete.

In response to block 410 determining that there are more sentences to consider, method 400 proceeds back to block 404 where relevance scores are recalculated for each of the sentences and the process of generating a next line of the document recap repeats, according to an embodiment. The relevance scores for the sentences will be different since a new line has been added to the recap and thus the redundancy factor may change for any number of the sentences. In response to block 410 determining that there are no more sentences to consider, method 400 proceeds to block 412 where the document recap is completed and may be displayed or otherwise presented to the user.

Figure 5:
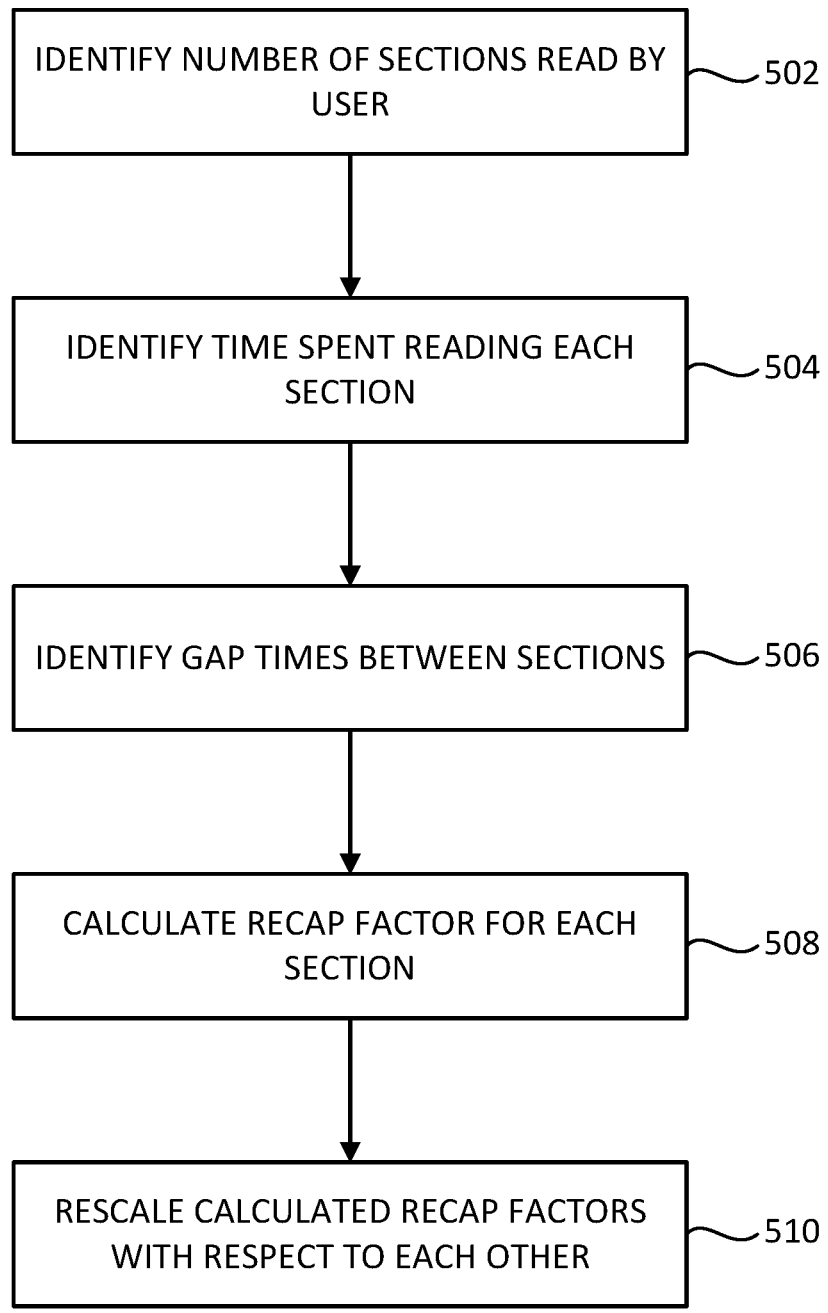
FIG. 5 is a flow diagram of a process for determining recap factors for each previously read section of a document, in accordance with some embodiments of the present disclosure.

FIG. 5 illustrates an example flowchart providing further operations of block 402 (also referred to herein as method 500) from method 400, according to an embodiment. The operations, functions, or actions described in the respective blocks of example method 500 may be stored as computer-executable instructions in a non-transitory computer-readable medium, such as a memory and/or a data storage of a computing system. As will be further appreciated in light of this disclosure, for this and other processes and methods disclosed herein, the functions performed in method 500 may be implemented in a differing order. Additionally, or alternatively, two or more operations may be performed at the same time or otherwise in an overlapping contemporaneous fashion.

At block 502, a number of different sections previously read by a given user are identified, according to an embodiment. Block 502 may be activated upon a user opening a document for at least a second time, such that there is at least one prior section that the user has read from the document. Application actions like opening and closing a document may be used to determine how many sections have been read by the user. For example, if it is determined that a document has been opened and successively closed on three different prior occasions, then that corresponds to three identifiable sections of the document. Furthermore, the content of each section is determined using a page number that the document was opened to and the page number where the document was closed. The content between the two page numbers corresponds to the content of the given section.

At block 504, a time spent by a user at each document section is identified, according to an embodiment. The time spent at a given document section may be determined by taking the time difference between a time associated with opening the document and a time associated with successively closing the document. This opening-closing pattern may occur any number of times corresponding to the number of previously read sections of the document.

At block 506, one or more gap times are determined between times that the document has been accessed by the user, according to an embodiment. A gap time may be determined by taking the time difference between a time associated with closing the document and a time associated with successively opening the document. Gap times can be determined between previously read sections of the document or between a most recently read section of the document and when the document is most recently accessed again by a user, according to some embodiments.

At block 508, a recap factor is calculated for each previous read section of the document, according to an embodiment. The recap factor provides a time-based relevancy weight to each section depending on how long in the past the section was read by the user. The recap factor for a given section is determined based on the length of the time gap(s) that proceed the given section and the total time of all time gaps and time spent reading each section. Equation (1) above provides the function for using the various time gaps and section read times to determine the recap factor for a given section x.

At block 510, the recap factors determined in block 508 are optionally normalized (e.g., rescaled) based on the highest determined recap factor and the lowest determined recap factor. The normalizing operation for a recap factor $t(S_x)$ may be provided as:

$$\tau_x = \frac{t(S_x) - \min(t(S))}{\max(t(S)) - \min(t(S))} \quad (3)$$

Where $\min(t(S))$ represents the lowest determined recap factor and $\max(t(S))$ represents the highest determined recap factor. The normalizing operation changes the highest determined recap factor to '1', the lowest determined recap factor to '0' and all other determined recap factors as some value between '0' and '1'. According to some embodiments, the normalized recap factors are then used in block 404 to determine relevance scores for each of the sentences in each previously read section of the document.

Figure 6:
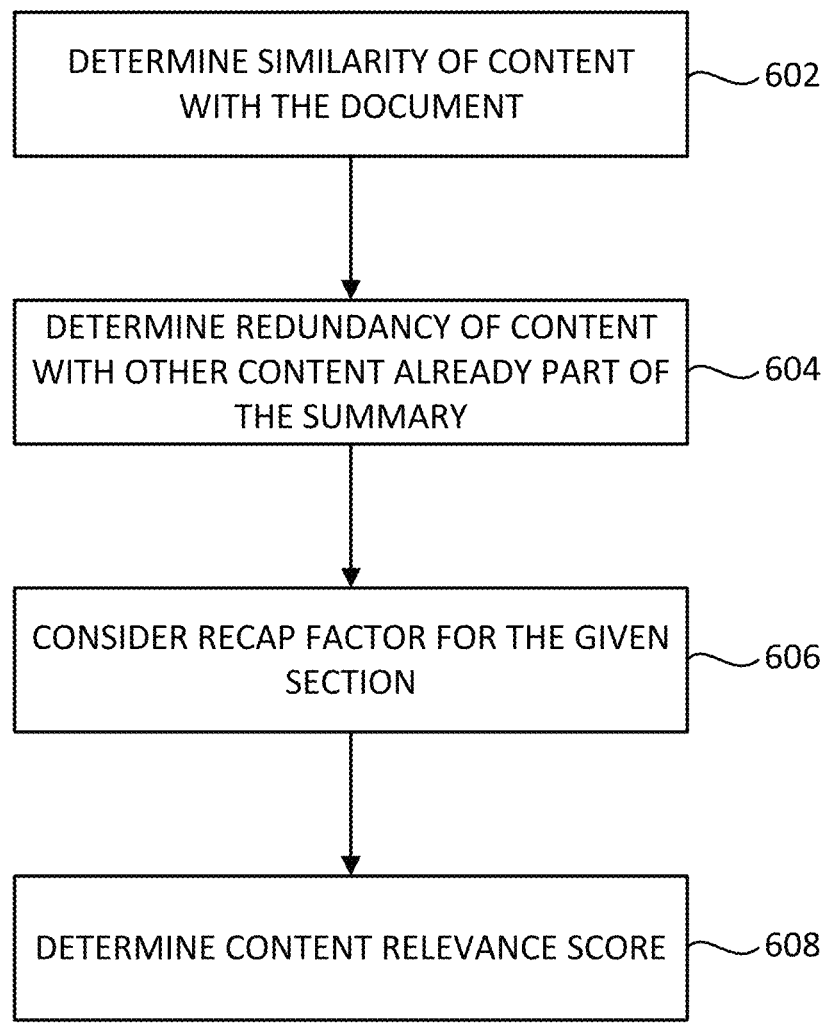
FIG. 6 is a flow diagram of a process for determining a relevance score for content items in the document, in accordance with some embodiments of the present disclosure.

FIG. 6 illustrates an example flowchart providing further operations of block 404 (also referred to herein as method 600) from method 400, according to an embodiment. The operations, functions, or actions described in the respective blocks of example method 600 may be stored as computer-executable instructions in a non-transitory computer-readable medium, such as a memory and/or a data storage of a computing system. As will be further appreciated in light of this disclosure, for this and other processes and methods disclosed herein, the functions performed in method 600 may be implemented in a differing order. Additionally, or alternatively, two or more operations may be performed at the same time or otherwise in an overlapping contemporaneous fashion.

The various operations of method 600 may be performed iteratively for each sentence and/or other document content to assign a relevance score to each sentence. In some other embodiments, the various operations of method 600 are performed for all sentences and/or other document content to assign relevance scores to all sentences after one pass through method 600.

At block 602, content similarity for a given sentence (or other document content) is determined compared to other content in the document, according to an embodiment. As discussed above, content similarity represents the importance of the given sentence (e.g., the more similarities found throughout the document, the more important the sentence). Content similarity may be quantitatively measured by determining the cosine similarity between the given sentence and another sentence in the document. Cosine similarity may be determined by taking the dot product of the vector representation of the two sentences.

At block 604, content redundancy is determined against other content already part of the recap, according to an embodiment. As discussed above, content redundancy refers to how similar a given sentence is to other sentences already part of the recap (e.g., the more similar the sentence is to the recap sentences, the higher the content redundancy). Content redundancy may be quantitatively measured by determining the maximum similarity between a given sentence from the document to each sentence that is already part of the generated recap and acts as a proxy of redundancy.

At block 606, the recap factor for a given section is considered in order to ultimately determine relevancy for a particular sentence in the given section. According to some embodiments, the same recap factor is applied to each sentence within a particular section of the document and each section has its own different recap factor. The time-based recap factor is a value between 0 and 1 that provides a weighted importance to each section depending on how long it has been since a user last read each section.

At block 608, a content relevance score is assigned to one or more sentences based on the different factors from blocks 602, 604, and 606, using the function discussed above in equation (2). Accordingly, each sentence is provided a unique content relevance score that is affected by the time-based recap factor.

Figure 7:
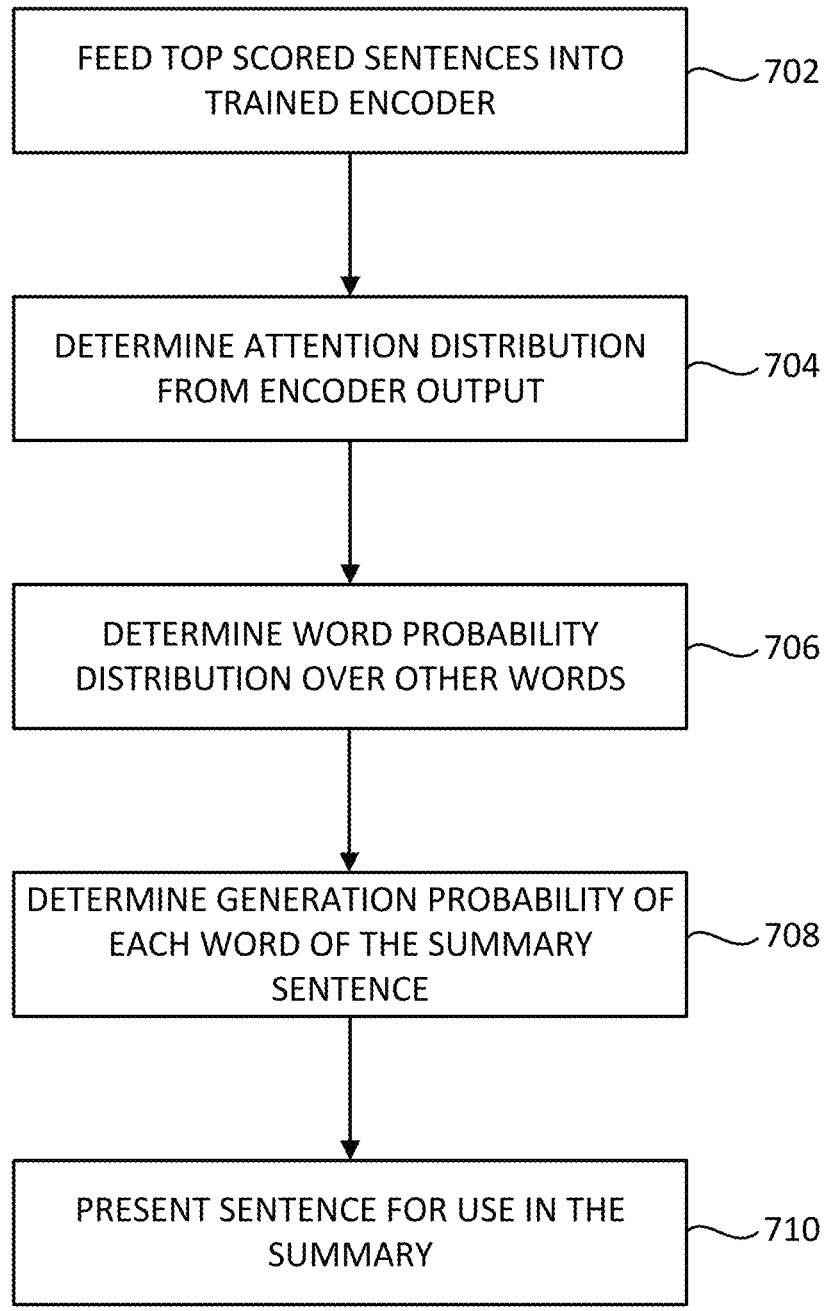
FIG. 7 is a flow diagram of a process for generating sentences to use in the recap based on the sentences with the top-rated relevance scores, in accordance with some embodiments of the present disclosure.

FIG. 7 illustrates an example flowchart providing further operations of block 408 (also referred to herein as method 700) from method 400, according to an embodiment. The operations, functions, or actions described in the respective blocks of example method 700 may be stored as computer-executable instructions in a non-transitory computer-readable medium, such as a memory and/or a data storage of a computing system. As will be further appreciated in light of this disclosure, for this and other processes and methods disclosed herein, the functions performed in method 700 may be implemented in a differing order. Additionally, or alternatively, two or more operations may be performed at the same time or otherwise in an overlapping contemporaneous fashion.

At block 702, a given number of top-scored sentences (e.g., highest relevance scores) are fed as inputs to a trained encoder, according to an embodiment. The encoder may be a single layer bi-directional LSTM network that produces a sequence of hidden encoder states ($h_i$).

At block 704, an attention distribution is determined based on the output from the encoder, according to an embodiment. More specifically, at each step t, the decoder (e.g., a single layer unidirectional LSTM) receives the hidden state for each word and the previously outputted word and has a decoder state of $s_t$. Using the obtained encoder hidden state and the decoder state, the attention distribution $a^t$ is calculated as:

$$e_i^t = v^T \tanh(W_h h_i + W_s s_t + b_{attn}) \quad (4)$$

$$a^t = \text{softmax}(e^t) \quad (5)$$

Where v, $W_h$, $W_s$, and $b_{attn}$ are learnable parameters. The attention distribution can be viewed as a probability distribution over the source words from the received sentences, that tells the decoder where to look to produce the next word to use in the recap.

According to some embodiments, the attention distribution is used to produce a weighted sum of the encoder hidden states, also known as a context vector $h^*_t$:

$$h^*_t = \Sigma_i a_i^t h_i \quad (6)$$

The context vector $h^*_t$ may be viewed as a fixed representation of each of the received source sentences.

At block 706, the context vector $h^*_t$ is concatenated with the decoder state $s_t$ and may be fed through two linear layers to produce a vocabulary distribution ($P_{vocab}$), which determines a probability distribution over all words in a given vocabulary:

$$P_{vocab} = \text{softmax}(V'(V[s_t, h^*_t] + b) + b') \quad (7)$$

Where V, V', b, and b' are learnable parameters. According to some embodiments, the vocabulary distribution provides a probability distribution from which to predict which words to use in the generated recap from words in a word repository.

At block 708, a generation probability for each word in the recap is determined. According to some embodiments, the generation probability for a given timestep t is determined using the context vector $h^*_t$, the decoder state $s_t$ and the decoder input $x_t$:

$$p_{gen} = \sigma(w_{h^*}^T h^*_t + w_s^T s_t + w_x^T x_t + b_{ptr}) \quad (8)$$

Where vectors $w^*_h$, $w_s$, $w_x$, and scalar $b_{ptr}$ are learnable parameters, and σ is a sigmoid function. $P_{gen}$ may be used as a soft switch to choose between generating a word to use next in the recap from a word repository (e.g., by sampling from $P_{vocab}$) or copying a word to use next in the recap directly from one of the received source sentences (e.g., by sampling from the attention distribution $a^t$). Accordingly, the following probability distribution can be obtained over the extended word vocabulary, where the extended word vocabulary represents the union of all words in the word repository and all words appearing in the received source sentences:

$$P(w) = p_{gen} P_{vocab}(\omega) + (1 - p_{gen}) \sum_{i: w_i = w} a_i^t \quad (9)$$

The final probability distribution P(w) is used to determine each next word (w) to use in each sentence of the document recap. According to some embodiments, once a full sentence has been completed, method 700 continues on to block 710.

At block 710, a completed sentence comprised of words either chosen from the word repository or copied from one of the received source sentences is presented as part of the document recap, according to an embodiment. The document recap may include more than one sentence produced via the operations of method 700.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

FURTHER EXAMPLE EMBODIMENTS

The following examples pertain to further embodiments, from which numerous permutations and configurations will be apparent.

Example 1 is a method for generating a summary of a document. The method includes determining a first time associated with a first instance of opening the document and a second time associated with an instance of closing the document; determining a section of the document accessed between the first time and the second time; determining a time difference between the second time and a third time associated with a second instance of opening the document; determining a recap factor based on (1) a time difference between the first time and the second time and (2) the time difference between the second time and a third time; determining a relevance score for each of a plurality of sentences within the section of the document based at least on the recap factor; selecting K number of sentences having the highest relevance scores, wherein the value of K is equal to a number of sentences having relevance scores above a given threshold; generating at least a portion of the summary of the document using at least the selected K number of sentences; and causing display of at least a portion of the summary.

Example 2 includes the subject matter of Example 1, wherein the section is a first section and the recap factor is a first recap factor. The method further includes determining a fourth time associated with a second instance of closing the document; determining a second section of the document accessed between the third time and the fourth time; determining a time difference between the fourth time and a fifth time associated with a third instance of opening the document; determining a second recap factor based on a time difference between the third time and the fourth time and the time difference between the fourth time and the fifth time, wherein the first recap factor is further determined based on the time difference between the fourth time and the fifth time; and determining a relevance score for each of a plurality of sentences within the second section of the document based at least on the second recap factor.

Example 3 includes the subject matter of Example 1 or 2, wherein determining the relevance score comprises determining a maximal marginal relevance (MMR) score.

Example 4 includes the subject matter of any one of Examples 1-3, further comprising receiving a request to expand the summary; and in response to receiving the request, causing display of an additional portion of the summary.

Example 5 includes the subject matter of any one of Examples 1-4, wherein the summary of the document further comprises at least one review comment from the section of the document.

Example 6 includes the subject matter of any one of Examples 1-5, wherein the summary of the document further comprises at least one figure from the section of the document.

Example 7 includes the subject matter of any one of Examples 1-6, wherein generating the summary further comprises using one or more words selected from a word repository.

Example 8 includes the subject matter of any one of Examples 1-7, further comprising normalizing the recap factor based on a plurality of other determined recap factors for other accessed sections of the document.

Example 9 is a system configured to generate a summary of a document. The system includes at least one processor and a plurality of modules executable by the at least one processor. The plurality of modules includes a document module, a scoring module, and a summarizing module. The document module is configured to determine a first timestamp associated with a first instance of opening the document and a second timestamp associated with an instance of closing the document, determine a section of the document accessed between the first timestamp and the second timestamp, and determine a time gap between the second timestamp and a third timestamp associated with a second instance of opening the document. The scoring module is configured to determine a recap factor based on (1) a difference between the first timestamp and the second timestamp and (2) the time gap, and determine a relevance score for each of a plurality of sentences within the section of the document based at least on the recap factor. The summarizing module is configured to select K number of sentences having the highest relevance scores, wherein the value of K is equal to a number of sentences having relevance scores above a given threshold, generate at least a portion of the summary of the document using at least the selected K number of sentences, and display at least a portion of the summary.

Example 10 includes the subject matter of Example 9, wherein the section is a first section, the recap factor is a first recap factor, and the time gap is a first time gap. The document module is further configured to determine a fourth timestamp associated with a second instance of closing the document, determine a second section of the document accessed between the third timestamp and the fourth timestamp, and determine a second time gap between the fourth timestamp and a fifth timestamp associated with a third instance of opening the document. The scoring module is further configured to determine a second recap factor based on a difference between the third time stamp and the fourth timestamp and the second time gap, wherein the first recap factor is further determined based on the second time gap, and determine a relevance score for each of a plurality of sentences within the second section of the document based at least on the second recap factor.

Example 11 includes the subject matter of Example 9 or 10, wherein the relevance score comprises a maximal marginal relevance (MMR) score.

Example 12 includes the subject matter of any one of Examples 9-11, wherein the summarizing module is further configured to receive a request to expand the summary; and in response to receiving the request, cause display of an additional portion of the summary.

Example 13 includes the subject matter of any one of Examples 9-12, wherein the summary of the document further comprises at least one review comment from the section of the document.

Example 14 includes the subject matter of any one of Examples 9-13, wherein the summary of the document further comprises at least one figure from the section of the document.

Example 15 includes the subject matter of any one of Examples 9-14, wherein the summarization module is further configured to generate at least a portion of the summary using one or more words selected from a word repository.

Example 16 includes the subject matter of any one of Examples 9-15, wherein the scoring module is further configured to normalize the recap factor based on a plurality of other determined recap factors for other accessed sections of the document.

Example 17 is a computer program product that includes one or more non-transitory machine-readable mediums having instructions encoded thereon that when executed by at least one processor cause a process to be carried out for generating a summary of a document. The process includes determining a first time associated with a first instance of opening the document and a second time associated with an instance of closing the document; determining a section of the document accessed between the first time and the second time; determining a time difference between the second time and a third time associated with a second instance of opening the document; determining a recap factor based on (1) a time difference between the first time and the second time and (2) the time difference between the second time and a third time; determining a relevance score for each of a plurality of sentences within the section of the document based at least on the recap factor; selecting K number of sentences having the highest relevance scores, wherein the value of K is equal to a number of sentences having relevance scores above a given threshold; generating at least a portion of the summary of the document using at least the selected K number of sentences; and causing display of at least a portion of the summary.

Example 18 includes the subject matter of Example 17, wherein the section is a first section and the recap factor is a first recap factor, the process further comprising determining a fourth time associated with a second instance of closing the document; determining a second section of the document accessed between the third time and the fourth time; determining a time difference between the fourth time and a fifth time associated with a third instance of opening the document; determining a second recap factor based on a time difference between the third time and the fourth time and the time difference between the fourth time and the fifth time, wherein the first recap factor is further determined based on the time difference between the fourth time and the fifth time; and determining a relevance score for each of a plurality of sentences within the second section of the document based at least on the second recap factor.

Example 19 includes the subject matter of Example 17 or 18, wherein determining the relevance score comprises determining a maximal marginal relevance (MMR) score.

Example 20 includes the subject matter of any one of Examples 17-19, wherein the process further comprises receiving a request to expand the summary; and in response to receiving the request, causing display of an additional portion of the summary.

Example 21 includes the subject matter of any one of Examples 17-20, wherein the summary of the document further comprises at least one review comment from the section of the document.

Example 22 includes the subject matter of any one of Examples 17-21, wherein the summary of the document further comprises at least one figure from the section of the document.

Example 23 includes the subject matter of any one of Examples 17-22, wherein generating the summary further comprises using one or more words selected from a word repository.

Example 24 includes the subject matter of any one of Examples 17-23, wherein the process further comprises normalizing the recap factor based on a plurality of other determined recap factors for other accessed sections of the document.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for generating a summary of a document, the method comprising:
    determining a first time associated with a first instance of opening the document and a second time associated with an instance of closing the document;
    determining a section of the document accessed between the first time and the second time;
    calculating a time difference between the second time and a third time associated with a second instance of opening the document;
    determining a recap factor for the section, wherein the recap factor is based on (1) a first quantity of time spent accessing the section, the first quantity corresponding to a time difference between the first time and the second time and (2) the time difference between the second time and the third time;
    determining an initial relevance score for each of a first plurality of sentences within the section of the document based at least on the recap factor;
    selecting $K_1$ of the first plurality of sentences, wherein $K_1$ is a number of sentences having initial relevance scores above a threshold;
    generating a first portion of the summary of the document using at least the selected $K_1$ sentences;
    determining a subsequent relevance score for each of a second plurality of sentences within the section of the document based on the recap factor, wherein both initial and subsequent relevance scores are generated for at least one sentence included in both the first and second pluralities of sentences;
    selecting $K_2$ of the second plurality of sentences, wherein $K_2$ is a number of sentences having subsequent relevance scores above the threshold;
    generating a second portion of the summary of the document using at least the selected $K_2$ sentences; and
    causing display of at least some of the summary.

2. The method of claim 1, wherein the section is a first section and the recap factor is a first recap factor, the method further comprising
    determining a fourth time associated with a second instance of closing the document;
    determining a second section of the document accessed between the third time and the fourth time;
    calculating a time difference between the fourth time and a fifth time associated with a third instance of opening the document;
    determining a second recap factor for the second section, wherein the second recap factor is based on (1) a second quantity of time spent accessing the second section, the second quantity corresponding to a time difference between the third time and the fourth time and (2) the time difference between the fourth time and the fifth time, wherein the first recap factor is further determined based on the time difference between the fourth time and the fifth time; and
    determining a relevance score for each of a plurality of sentences within the second section of the document based at least on the second recap factor.

3. The method of claim 1, wherein determining the initial relevance score comprises determining a maximal marginal relevance (MMR) score.

4. The method of claim 1, further comprising
    receiving a request to expand the summary; and
    in response to receiving the request, causing display of an additional portion of the summary.

5. The method of claim 1, wherein the summary of the document further comprises at least one review comment from the section of the document.

6. The method of claim 1, wherein generating the summary further comprises using one or more words selected from a word repository.

7. The method of claim 1, further comprising normalizing the recap factor based on a plurality of other determined recap factors for other accessed sections of the document.

8. A system configured to generate a summary of a document, the system comprising:
    at least one processor;
    a document module, executable by the at least one processor, and configured to
        determine a first timestamp associated with a first instance of opening the document and a second timestamp associated with an instance of closing the document,
        determine a section of the document accessed between the first timestamp and the second timestamp, and
        calculate a time gap between the second timestamp and a third timestamp associated with a second instance of opening the document;

a scoring module, executable by the at least one processor, and configured to
    determine a recap factor for the section, wherein the recap factor is based on (1) a first quantity of time spent accessing the section, the first quantity corresponding to a difference between the first timestamp and the second timestamp and (2) the time gap, and
    determine a relevance score for each of a plurality of sentences within the section of the document based at least on the recap factor; and
a summarizing module, executable by the at least one processor, and configured to
    select K number of sentences having highest relevance scores, wherein K is equal to a number of sentences having relevance scores above a given threshold,
    generate at least a portion of the summary of the document using at least the selected K number of sentences, and
    display at least some of the summary.

9. The system of claim 8, wherein the section is a first section, the recap factor is a first recap factor, and the time gap is a first time gap,
    the document module being further configured to
        determine a fourth timestamp associated with a second instance of closing the document,
        determine a second section of the document accessed between the third timestamp and the fourth timestamp, and
        calculate a second time gap between the fourth timestamp and a fifth timestamp associated with a third instance of opening the document, and the scoring module being further configured to
        determine a second recap factor for the second section, wherein the second recap factor is based on (1) a second quantity of time spent accessing the second section, the second quantity corresponding to a difference between the third timestamp and the fourth timestamp and (2) the second time gap, wherein the first recap factor is further determined based on the second time gap, and
        determine a relevance score for each of a plurality of sentences within the second section of the document based at least on the second recap factor.

10. The system of claim 8, wherein the relevance score comprises a maximal marginal relevance (MMR) score.

11. The system of claim 8, wherein the summarizing module is further configured to
    receive a request to expand the summary; and
    in response to receiving the request, cause display of an additional portion of the summary.

12. The system of claim 8, wherein the summary of the document further comprises at least one review comment from the section of the document.

13. The system of claim 8, wherein the summarizing module is further configured to generate at least some of the summary using one or more words selected from a word repository.

14. The system of claim 8, wherein the scoring module is further configured to normalize the recap factor based on a plurality of other determined recap factors for other accessed sections of the document.

15. A computer program product including one or more non-transitory machine-readable mediums having instructions encoded thereon that when executed by at least one processor cause a process to be carried out for generating a summary of a document, the process comprising:
    determining a first time associated with a first instance of opening the document and a second time associated with an instance of closing the document;
    determining a section of the document accessed between the first time and the second time;
    determining a time difference between the first time and a summarization time associated with creation of the summary of the document;
    determining a recap factor for the section, the recap factor based on (1) the a time difference between the first time and the summarization time and (2) an amount of idle time occurring between the second time and the summarization time, wherein the document is closed during the idle time;
    determining a relevance score for each of a plurality of sentences within the section of the document based at least on the recap factor;
    selecting K number of sentences having highest relevance scores, wherein K is equal to a number of sentences having relevance scores above a given threshold;
    at the summarization time, generating at least a portion of the summary of the document using at least the selected K number of sentences; and
    causing display of at least some of the summary.

16. The computer program product of claim 15, wherein the section is a first section and the recap factor is a first recap factor, the process further comprising
    determining a third time associated with a second instance of opening the document and a fourth time associated with a second instance of closing the document;
    determining a second section of the document accessed between the third time and the fourth time;
    determining a second recap factor based on (1) the time difference between the first time and the summarization time and (2) an amount of idle time occurring between the fourth time and the summarization time, wherein the document is closed during the idle time; and
    determining a relevance score for each of a plurality of sentences within the second section of the document based at least on the second recap factor.

17. The computer program product of claim 15, wherein the process further comprises
    receiving a request to expand the summary; and
    in response to receiving the request, causing display of an additional portion of the summary.

18. The computer program product of claim 15, wherein the summary of the document further comprises at least one review comment from the section of the document.

19. The computer program product of claim 15, wherein generating the summary further comprises using one or more words selected from a word repository.

20. The computer program product of claim 15, wherein the process further comprises normalizing the recap factor based on a plurality of other determined recap factors for other accessed sections of the document.

* * * * *